Patented Feb. 9, 1926.

1,572,123

UNITED STATES PATENT OFFICE.

BARTOL PLISIC, OF WHITEHALL, MONTANA.

METHOD FOR MAKING BUTTER.

No Drawing.   Application filed April 25, 1925.  Serial No. 25,930.

*To all whom it may concern:*

Be it known that I, BARTOL PLISIC, a citizen of the United States, residing at Whitehall, in the county of Jefferson and State of Montana, have invented certain new and useful Improvements in Methods for Making Butter, of which the following is a specification, reference being had to the accompanying drawings.

This invention relates to a method for making butter and it is an object of the invention to provide a method for this general purpose wherein the resultant product is of a character to remain good indefinitely in any climate.

Another object of the invention is to provide a method of this general character wherein the liquid during the churning operation is maintained at a relatively high temperature.

Furthermore, it is an object of the invention to provide a method of this kind wherein after the liquid has been churned for a predetermined period of time the butter then formed is skimmed off or separated and then heated to a boiling point after which it is chilled.

In my improved method the milk in its natural state or as just taken from a cow is suitably heated until it reaches substantially 98° F. or blood heat. It is then churned in any desired manner and if upon test the liquid is found to be unduly cool the desired temperature is restored by adding warm water of requisite temperature. The milk is churned until it has the appearance of white light cream then it is poured into a pan or kettle. The butter formed will readily float and is skimmed off. This butter after being sprinkled with a little salt is then placed in a suitable container and boiled until it becomes a thin liquid like water whereupon it is then permitted to cool and put in a suitable receptacle and subjected to a temperature of about 40°.

My improved method of making butter can be employed to particular advantage on small farms where there may be but a single cow. If after milking there is insufficient milk from which to make the butter, such milk may be boiled until it rises and then permitted to cool. This is continued at successive milkings until a desired supply is at hand for the churning operation. If preferred, after the boiling operation the cream may be skimmed off or separated and set aside and the resultant milk used. It is to be understood, however, that when such cream is to be employed in the making of the butter the same will have mixed therewith a quantity of milk to restore the same to substantially the same condition as when taken from the cow.

I claim:—

A method of making butter consisting in raising the temperature of milk to substantially blood heat and maintaining such temperature while subjecting the same to a churning operation until the milk is in the form of a white light cream, then skimming off the butter, then melting the butter into a liquid state, and then cooling the same.

In testimony whereof I hereunto affix my signature.

BARTOL PLISIC.